United States Patent
Wu et al.

(10) Patent No.: US 12,392,923 B2
(45) Date of Patent: Aug. 19, 2025

(54) RESISTIVITY LOGGING IN SLIDING MODE

(71) Applicant: Halliburton Energy Services, Inc., Houston, TX (US)

(72) Inventors: Hsu-Hsiang Wu, Sugar Land, TX (US); Yi Jing Fan, Singapore (SG); Jin Ma, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 178 days.

(21) Appl. No.: 18/233,665

(22) Filed: Aug. 14, 2023

(65) Prior Publication Data
US 2025/0060506 A1 Feb. 20, 2025

(51) Int. Cl.
*G01V 3/36* (2006.01)
*G01V 3/30* (2006.01)

(52) U.S. Cl.
CPC . *G01V 3/36* (2013.01); *G01V 3/30* (2013.01)

(58) Field of Classification Search
CPC ... G01V 3/36; G01V 3/30; G01V 3/26; G01V 3/28
See application file for complete search history.

(56) References Cited

U.S. PATENT DOCUMENTS

| | | | |
|---|---|---|---|
| 5,892,460 | A | 4/1999 | Jerabek et al. |
| 7,265,552 | B2 | 9/2007 | Bittar |
| 2005/0140373 | A1 | 6/2005 | Li et al. |
| 2013/0226459 | A1* | 8/2013 | Gorek ............... E21B 47/092 702/7 |
| 2014/0368197 | A1* | 12/2014 | Wang ................ G01V 3/34 324/333 |
| 2017/0260837 | A1* | 9/2017 | Wu .................. G01V 13/00 |
| 2018/0045847 | A1 | 2/2018 | Zeng et al. |
| 2020/0003930 | A1* | 1/2020 | Ma .................. G01V 3/30 |
| 2020/0173270 | A1 | 6/2020 | Zhan |
| 2021/0230998 | A1* | 7/2021 | Chen ................ E21B 7/067 |
| 2023/0243252 | A1 | 8/2023 | Benson et al. |

OTHER PUBLICATIONS

International Search Report & Written Opinion; PCT Application No. PCT/US2023/030233; mailed Apr. 30, 2024.
Abstract of Rodney, Paul F. et al. "Electromagnetic Wave Resistivity MWD Tool", SPE Drill Eng 1 (05): 337-346; Paper No. SPE-12167-PA; Oct. 1, 1986.

* cited by examiner

*Primary Examiner* — Alvaro E Fortich
(74) *Attorney, Agent, or Firm* — NOVAK DRUCE CARROLL LLP

(57) ABSTRACT

Systems and methods for smoothing a resistivity log are disclosed. An azimuthal resistivity tool measures azimuthal impedances at multiple azimuthal angles around a wellbore axis at each depth. It is determined whether the drill string was in a drilling mode or a sliding mode at the depth. If the drill string was in the drilling mode, a co-axial component and a lateral component are determined based in part on the azimuthal impedances associated with the depth and the lateral component is stored. If the drill string was in the sliding mode, a second co-axial component is determined based in part on at least one of the plurality of azimuthal impedances and a previously stored lateral component. The resistivity log is plotted from resistivities determined from the first and second co-axial components at each depth.

20 Claims, 4 Drawing Sheets

"drilling" mode

"sliding" mode

US 12,392,923 B2

RESISTIVITY LOGGING IN SLIDING MODE

TECHNICAL FIELD

The present technology pertains to logging of resistivity measurements in a wellbore.

BACKGROUND

Drilling and/or completion of a petroleum well often involves logging-while-drilling (LWD) using a resistivity tool. The nature of the electromagnetic measurement requires that the tool be equipped with a loop antenna that fits around the drill collar and emits electromagnetic waves. The waves travel through the immediate wellbore environment and are detected by a pair of receiver antennae. Two types of wave measurements are performed at the receivers. The attenuation of the wave amplitude as it arrives at the two receivers yields an attenuation ratio measurement. The phase difference in the wave arrival at the two receivers yields a phase-difference measurement. These measurements are then converted to resistivity values through the use of a conversion derived from computer modeling or test tank data.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
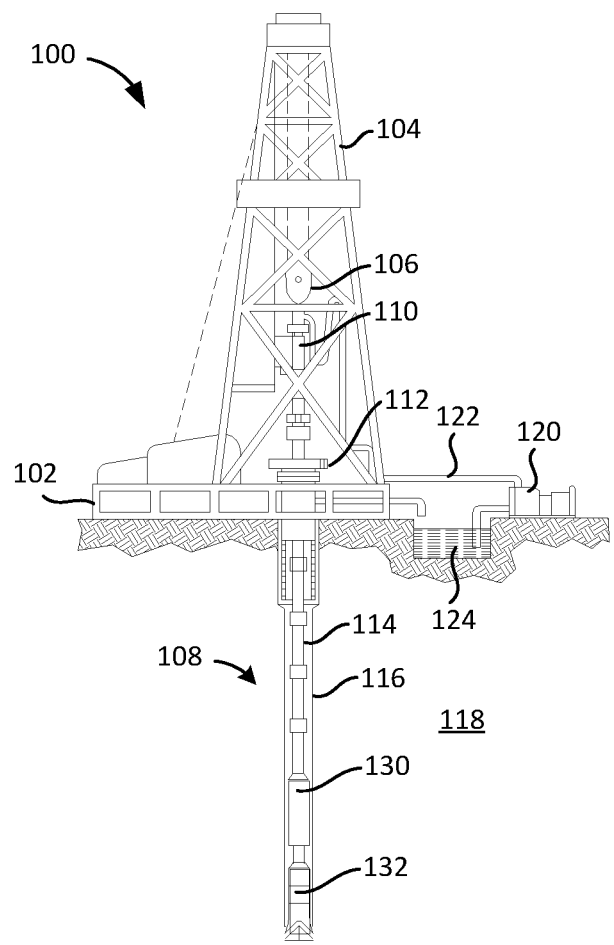
FIG. 1 depicts a drilling arrangement in schematic form, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Resistivity is used in real-time during drilling of a wellbore to identify the formations and provide guidance to steer the drill toward the desired strata. Resistivity tools having angled receiver loops, referred to herein as "azimuthal resistivity" tools, measure complex impedances in the receiver loops at incremental azimuthal angles over a complete rotation while in drilling mode, thereby providing a directional evaluation of the surrounding formation. To provide near-real-time information to the drilling team, the measured impedance values are averaged over a complete rotation of the tool, thereby cancelling out the lateral components and providing only the coaxial component (ZZ) of the signal. However, during trip-in/trip-out or other conditions when the drill string is not rotating, the azimuthal resistivity tool collects valid measured voltages only over a limited angular range, sometimes just one angle. In the absence of a complete set of azimuthal measurements, averaging does not remove the lateral component. The result is a "jump" in the resistivity signal when the drill string transitions between drilling mode and sliding mode. As this jump is an artifact, i.e., not related to a real change in the formation, the jump adversely affects steering decisions by the drill team.

The disclosed technology addresses the foregoing by estimating the lateral component while in sliding mode from prior data collected while in drilling mode. The impedance measurement is adjusted while in sliding mode based at least partially on the previously measured lateral component, resulting in a smoothed resistivity signal that eliminates the confusing jump artifact when transitioning between modes.

In this document, an azimuthal resistivity tool may be described as either measuring a voltage induced on a receiver antenna by an electromagnetic field created by a signal on a transmitter antenna or an impedance of the receiver antenna. These are considered interchangeable and equivalent and either can be unambiguously converted to a complex resistivity as a necessary next step. Thus, measurements of voltage, impedance, and resistivity are generally considered equivalent and interchangeable herein.

FIG. 1 depicts a drilling arrangement 100 in schematic form, in accordance with various aspects of the subject technology. A drilling platform 102 is equipped with a derrick 104 that supports a hoist 106 for raising and lowering a drill string 108 within a wellbore 116 through formation 118. The hoist 106 suspends a top drive 110 suitable for adding drill pipe sections 114 to the drill string 108 as well as raising and lowering the drill string 108 through a well head 112. In this example, a drill bit 132 is connected to the lower end of the drill string 108. A pump 120 circulates a drilling fluid, also referred to as "mud," through a supply pipe 122 to top drive 110 and down through the interior of drill string 108. The drilling fluid returns to the surface via the annulus around drill string 108 and into a retention pit 124. The drilling fluid has multiple possible functions, e.g., serving as a communication medium and maintain the integrity of the wellbore 116. In this example, a tool 130, e.g., a resistivity tool, is included in the drill string 108 adjacent to the drill bit 132 so as to evaluate the formation 118, e.g., quantify the depth of invasion of the drilling fluid into the formation 118, while drilling. In certain embodiments, the tool 130 is suspended in the wellbore 116 on a wireline (not shown in FIG. 1) to evaluate the formation 118 after the wellbore 116 has been drilled.

Figure 2:
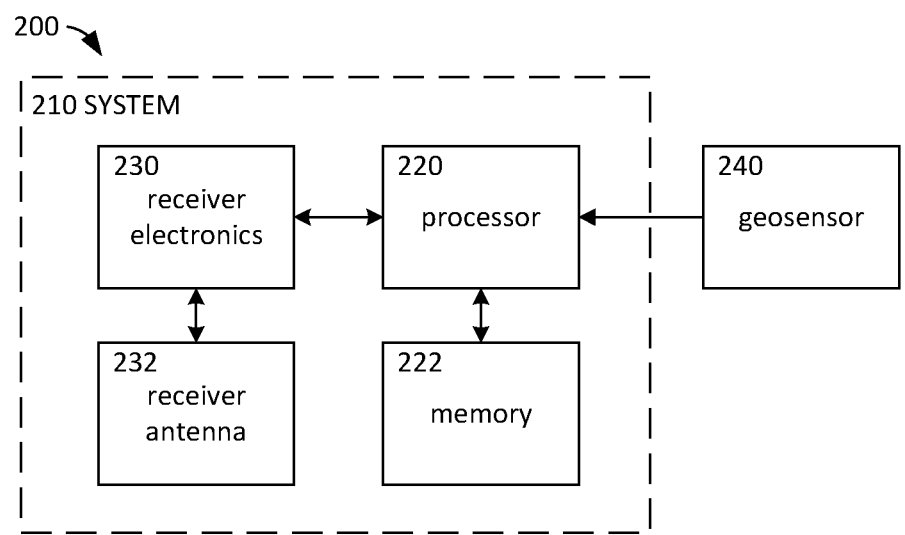
FIG. 2 depicts a block diagram of an example system, in accordance with various aspects of the subject technology.

FIG. 2 depicts a block diagram 200 of an example system 210, in accordance with various aspects of the subject technology. The system 210 comprises a receiver electronics module 230 coupled to a receiver antenna 232, which will be described further with respect to FIGS. 3A-3B. A processor 220 is communicatively coupled to the receiver electronics module 230 and to a memory 222 that contains instructions that, when loaded into the processor 220 and executed, cause the processor 220 to execute one or more steps of the disclosed method. In certain embodiments, the processor 220 is also communicatively coupled to a geosensor 240, e.g., a magnetometer, that provides information about the angular position of the system 210 with respect to the formation 118 as the system 210 rotates with the drill string 108 while drilling. In certain embodiments, the geosensor 240 is implemented as a remote angular measurement system, e.g., an angular position sensor disposed on the drilling platform 102 and configured to determine the azimuthal angle of the drill string 108. In certain embodiments, the geosensor 240 also provides a depth in the wellbore 116. In certain embodiments, the geosensor 240 information is provided by a surface device, e.g., located on the drilling platform 102.

Figure 3A:
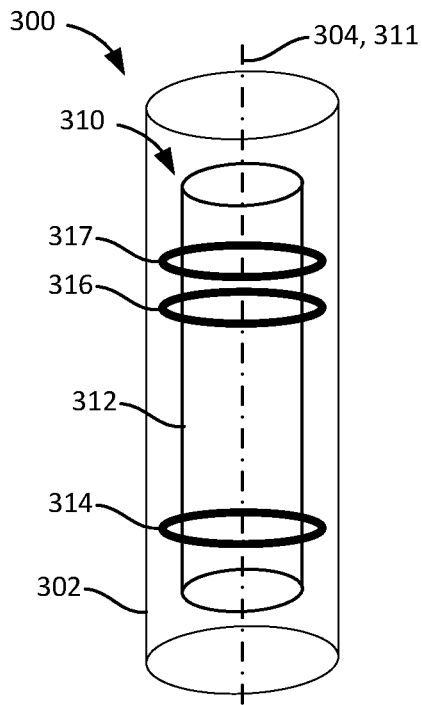
FIGS. 3A-3B are simplified depictions of example antenna arrangements for resistivity tools, in accordance with various aspects of the subject technology.

FIG. 3A is simplified depiction 300 of a co-axial antenna arrangement of an example resistivity tool 310, also referred to herein as an electromagnetic wave resistivity (EWR) tool, in accordance with various aspects of the subject technology. The tool 310 has a body 312 configured to be disposed in a wellbore 302 having a wellbore axis 304 and comprising a tool axis 311 that is aligned with the wellbore axis 304 when the body 312 is disposed in the wellbore 302. The tool 310 comprises a transmitter antenna 314 that is aligned with the tool axis 311, i.e., the antenna 314 is formed as a generally planar loop having a perpendicular that is aligned with the tool axis 311. In this example, the tool 310 also comprises receiver antennae 316, 317 that are disposed at respective distances from the transmitter antenna 314 and also aligned with the tool axis 311. In this configuration, the receiver antennae 316, 317 detect only the co-axial component of the field created by the transmitter antenna 314 as known to those of skill in the art.

Figure 3B:
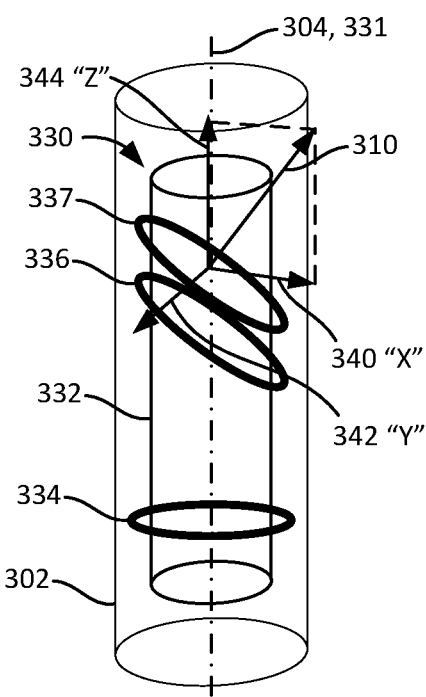

FIG. 3B is simplified depiction of an antenna arrangement of an example azimuthal resistivity tool 330, in accordance with various aspects of the subject technology. The tool body 332, tool axis 331, and transmitter antenna 334 are generally consistent with the body 312 of the co-axial tool 310. The tool body 332 has an X-Y-Z local coordinate system that is shown in FIG. 3B as Z-axis 334 that is aligned with the tool axis 331 and X-axis 340 and Y-axis 342 that are mutually perpendicular to each other and to Z-axis 344. The receiver antennas 336, 337 are disposed at non-zero angles to the tool axis 331. In the example of FIG. 3B, the antennae 336, 337 are disposed at a common angle and have a common perpendicular axis 310 in the X-Z plane.

As is known to those of skill in the art, the receiver antennae 336, 337 detect complex voltages induced by the electromagnetic field created by the signal applied to the transmitter antenna 334. Due to the difference in the respective distances from the transmitter antenna 334, the voltages induced in the receiver antennae 336, 337 will have different magnitudes and phases. The measured voltages can be converted to a complex impedance or to a complex resistivity by means known to those of the skill in the art.

For a resistivity system having a transmitter antenna T and receiver antennae R1 and R2, the relationship of the configuration of the antennae 334, 336, 337 to the co-axial and lateral components of the measured impedances is given by equations 1-2.

$$Z_{TR1}(\beta) = \begin{bmatrix} \sin\theta_T \cos\beta \\ \sin\theta_T \cos\beta \\ \cos\theta_T \end{bmatrix} \begin{bmatrix} Z_{XX1} & 0 & Z_{XZ1} \\ 0 & Z_{YY1} & 0 \\ Z_{ZX1} & 0 & Z_{ZZ1} \end{bmatrix} \begin{bmatrix} \sin\theta_R \cos\beta \\ \sin\theta_R \cos\beta \\ \cos\theta_R \end{bmatrix} \quad (\text{eqn. 1})$$

$$Z_{TR2}(\beta) = \begin{bmatrix} \sin\theta_T \cos\beta \\ \sin\theta_T \cos\beta \\ \cos\theta_T \end{bmatrix} \begin{bmatrix} Z_{XX2} & 0 & Z_{XZ2} \\ 0 & Z_{YY2} & 0 \\ Z_{ZX2} & 0 & Z_{ZZ2} \end{bmatrix} \begin{bmatrix} \sin\theta_R \cos\beta \\ \sin\theta_R \cos\beta \\ \cos\theta_R \end{bmatrix} \quad (\text{eqn. 2})$$

where:
the X, Y, Z axes are defined in the EMR tool body (rotates around Z in drilling mode)
the transmitter and receiver antennae are tilted about the Y-axis
$\beta$ azimuth angle of X-axis about Z-axis with respect to wellbore
$\theta_T$ angle of transmitter antenna from axial orientation at $\beta=0$
$\theta_R$ angle of receiver antenna from axial orientation at $\beta=0$
$Z_{TRx}$ complex resistivity as measured by receiver antenna x
$Z_{ZZx}$ Z-axis component of complex resistivity of receiver antenna x When $\theta_T$=zero, as shown in FIG. 3B, equations 1 and 2 reduce to equations 3-4:

$$Z_{TR1} = (\cos\theta_R)(Z_{ZZ1} + Z_{ZX1} \cdot \cos\beta) \quad (\text{eqn. 3})$$

$$Z_{TR2} = (\cos\theta_R)(Z_{ZZ2} + Z_{ZX2} \cdot \cos\beta) \quad (\text{eqn. 4})$$

As the antennae are tilted only about the Y-axis in this example, there are no $Z_{XY_x}$ or $Z_{XY_x}$ components in the measured resistivity. This simplification is easily implemented for any arbitrary direction of tilt of the antennae by defining the X-axis 340 in the direction of the actual antennae tilt.

When the $Z_{TR1}$ measurements are averaged over a complete rotation of the drill string (from $\beta$=0 to $\beta$=360 degrees), the X component ($Z_{ZX1} \cdot \cos\beta$) cancels out leaving only the axial component $Z_{ZZ1}$. Although there is some Z-axis advancement of the drill string 118 while drilling, this advancement is small compared to the intervals of measurement and is neglected, resulting in a set of measurements of a full rotation being associated with a common depth.

Figure 4:
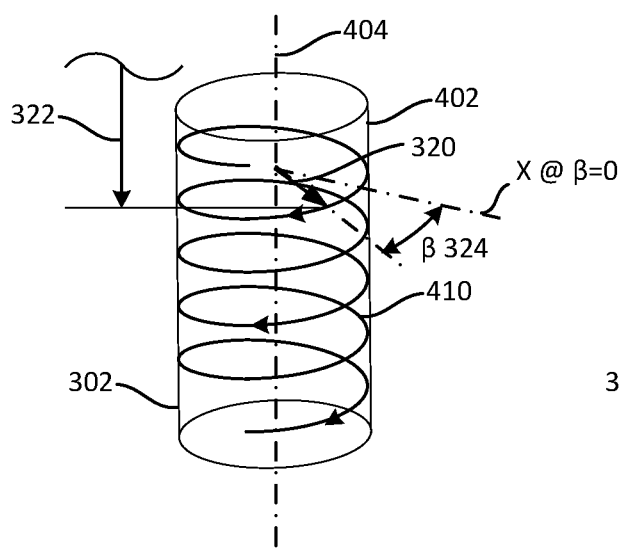
FIGS. 4-5 illustrate drilling and sliding modes, in accordance with various aspects of the subject technology.

FIG. 4 illustrates the motion of the tool 330 while the drill string 108 is in a drilling mode, in accordance with various aspects of the subject technology. A lateral reference axis 320 is fixed in the body 330 and a β=0 reference direction is fixed in the formation 118. A drill bit 132 (not shown in FIG. 4) is being rotated, e.g., by rotation of the drill string 108, and the tool 330 rotates with the drill string 108. As the drill bit 132 advances through the formation 118 to form a wellbore 402, the reference axis 320 follows a spiral path around the wellbore axis 404. At any given moment, the azimuthal position of reference axis 320 is defined by an angle 324 (β) and a depth 322.

Figure 5:
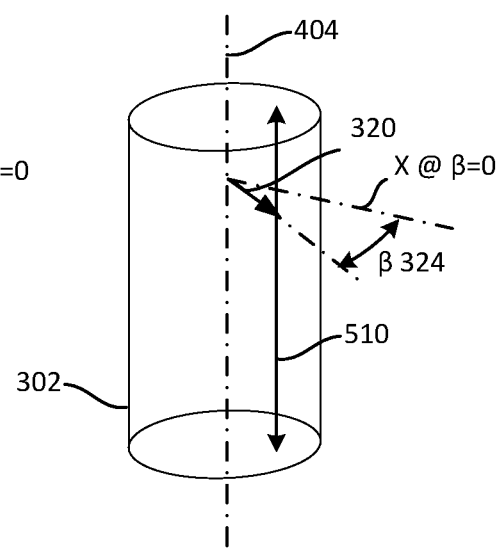

FIG. 5 illustrates the motion of the tool 330 while the drill string 108 is in a sliding mode, in accordance with various aspects of the subject technology. The angle 324 of the reference axis 320 is generally fixed while in the sliding mode and the reference axis 320 following a generally linear vertical path 510. There may be small angular motions induced by external forces on the tool 330 and/or drill string 108 as the drill string 108 is raised or lowered.

Figure 6:
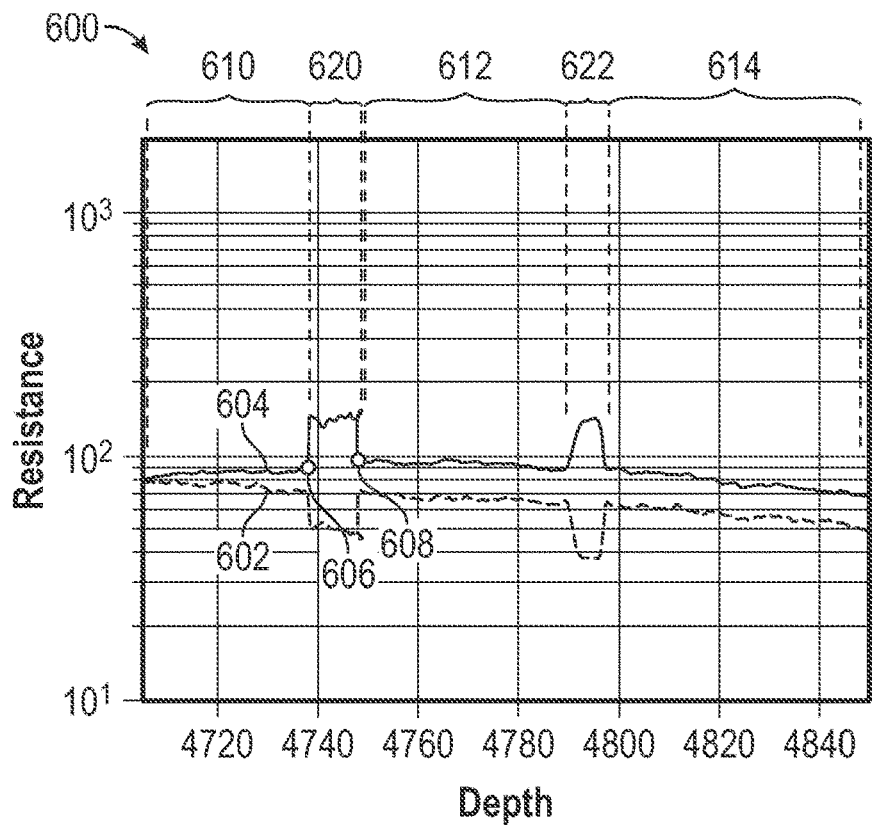
FIG. 6 depicts an example of how resistivity is conventionally presented, in accordance with various aspects of the subject technology.

FIG. 6 depicts an example plot 600 of how resistivity is conventionally presented, in accordance with various aspects of the subject technology. The curve 602 is the computed co-axial resistivity based in part on the measured complex voltages sensed by an angled receiver antenna, e.g., antenna 336 of FIG. 3B, disposed 16 inches from a transmitter antenna, e.g., antenna 334 of FIG. 3B, over a range of depths. The curve 604 is the computed co-axial resistivity from a second angled receiver antenna, e.g., antenna 337 of FIG. 3B, disposed 32 inches from the transmitter antenna. In general, there is a larger resistivity measured at a greater distance from the transmitter antenna.

Point 606 of curve 604 marks a transition from a drilling mode in the portion 610 of curves 602, 604 to a sliding mode in portion 620. Similarly, point 608 marks a transition from the sliding mode portion 620 to the drilling mode in portion 612. The discontinuity in each of curves 602, 604 are artifacts of the computational method that extracts the co-axial component of the resistivity from the plurality of azimuthal measurements, i.e., these discontinuities in resistivity do not represent real changes in the formation 118. As the drilling team uses the resistivity to determine boundaries within the formation 118 and steer the drill bit, the team must carefully review this type of resistivity plot 600 to determine whether each transition is real or an artifact to avoid making an incorrect steering decision.

Figure 7:
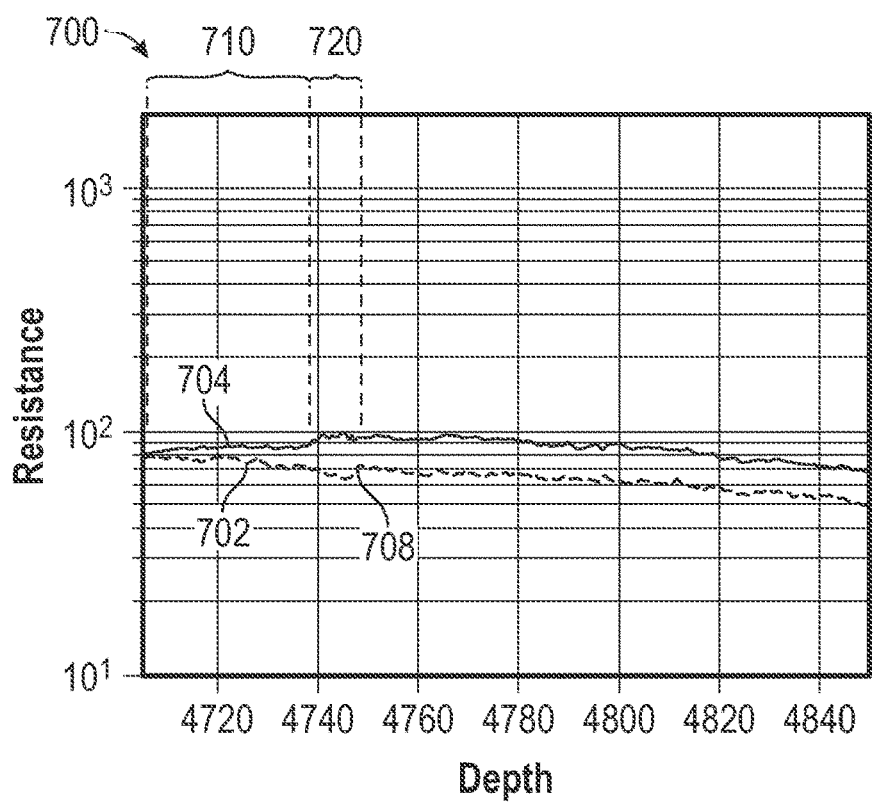
FIG. 7 depicts an example of how resistivity is presented with the disclosed systems and methods, in accordance with various aspects of the subject technology.

FIG. 7 depicts an example plot 700 of how resistivity is presented with the disclosed systems and methods, in accordance with various aspects of the subject technology. The curves 702, 704 are based on the same measurements as curves 602. 604 of FIG. 6, with the application of the disclosed methods. The drilling mode portion 710 and the sliding mode portion 720 are respectively the same as portions 610, 620. The replacement of the resistivities derived from the raw measured azimuthal voltages in the sliding mode portion 720 with an estimated co-axial component using a lateral component, e.g., calculated from data in the portion 710, has smoothed the curves 702, 704. In this example, a small discontinuity remains at point 708, but this is much smaller than the discontinuity at the equivalent point 608. An artifact of this small magnitude is unlikely to cause concern to the drilling team.

Figure 8:
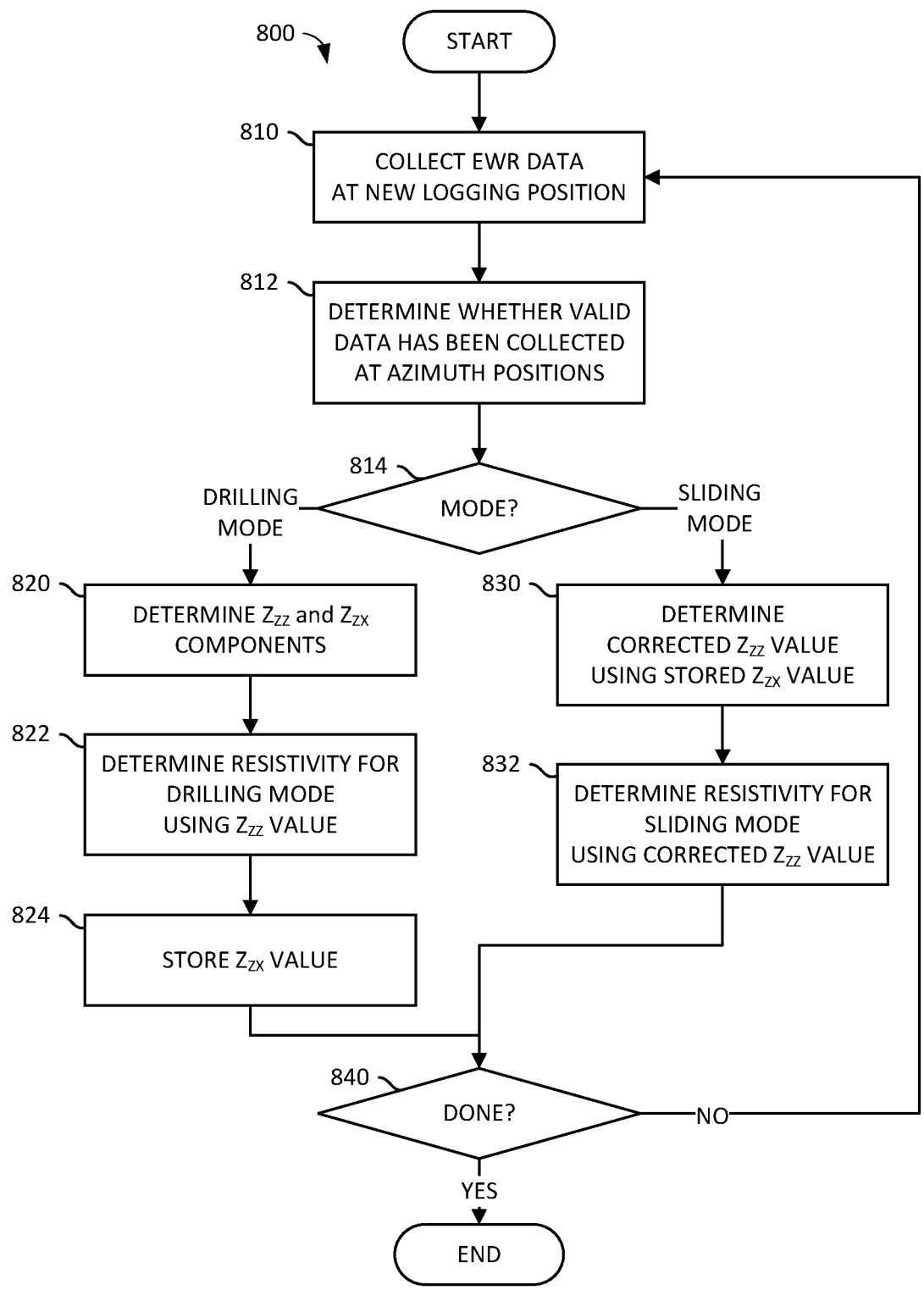
FIG. 8 is a flow chart of an example method of determining resistivity, in accordance with various aspects of the subject technology.

FIG. 8 is a flow chart 800 of an example method of determining resistivity, in accordance with various aspects of the subject technology. With reference to FIG. 1, the process starts in step 810 when the tool 130 reaches a new logging position, e.g., a new depth in the wellbore 116, and collects a set of voltage measurements using the receiver antennae at a respective plurality of azimuthal angles. In certain embodiments, these voltages are converted to impedances and stored in association with the azimuthal angle at which they were measured, e.g., in a data array of angles and measurements. In certain embodiments, the voltages are stored. In certain embodiments, a measurement is made at each of a predetermined plurality of azimuthal angles. In this example, the data array is examined in step 812 to determine whether a valid measurement was taken at each of the azimuthal angles. Step 814 compares the number of valid measurements to a threshold. If the number of valid measurements is greater than or equal to the threshold, the drill string is operating in drilling mode and the process branches to step 820. If the number of valid measurements is less than the threshold, the drill string is operating in sliding mode and the process branches to step 830. In certain embodiments, steps 812 and 814 are accomplished by an alternate method, e.g., receiving a status indicator from an external source that identifies which mode the drill string is in at this depth, with the net result of distinguishing the mode associated with this set of measurements.

If the measurements were collected while in drilling mode, there will be a measurement for most or all of the azimuthal angles. Step 820 determines a co-axial magnitude $Z_{ZZ}$ and a lateral magnitude $Z_{ZX}$ of the voltage at this depth and step 822 converts these voltages to resistivities. In this example, the $Z_{ZX}$ voltage is stored in association with this depth in step 824.

If the measurements were collected while in sliding mode, there will be a valid measurement for only a small number, perhaps only one, of the azimuthal angles. Step 830 uses one of the valid measurements and a previously stored $Z_{ZX}$ voltage, i.e., stored in association with a different depth, to determine a corrected co-axial magnitude $Z_{ZZ}$ for this depth. Step 832 converts the corrected co-axial voltage $Z_{ZZ}$ to a resistivity. In certain embodiments, the previously stored $Z_{ZX}$ voltage is the most-recently stored lateral component. In certain embodiments, the previously stored $Z_{ZX}$ voltage is the nearest-depth stored lateral component. In certain embodiments, the previously stored $Z_{ZX}$ voltage is associated with a depth within the same local formation as the current depth.

Step 840 branches back to step 810 to repeat the process at a new depth during continued operation of the Azimuthal resistivity tool and branches to the end if operation of the Azimuthal resistivity tool is completed.

In summary, the disclosed systems and methods provide a smoothed logging of the co-axial resistivity while operating in either drilling mode or sliding mode. The lateral component determined during drilling mode is stored at one or more depths. The measurements made during sliding mode are corrected based on a previously stored lateral component to produce an estimated co-axial component. A resistivity log produced with a combination of data-based co-axial resistivities from the drilling mode portions of the drilling operation and the corrected co-axial resistivities from the sliding mode portions will have greatly reduced discontinuity artifacts at the transitions between drilling and sliding modes. This smoothed log avoids the need for the drilling team to assess each discontinuity to distinguish between a true discontinuity, e.g., at a boundary between formations types, and artifacts from the mode of operation.

For clarity of explanation, in some instances the present technology may be presented as including individual functional blocks including functional blocks comprising devices, device components, steps or routines in a method embodied in software, or combinations of hardware and software.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a non-volatile computer-readable memory, or other data storage medium, comprising program code including instructions that, when executed, performs one or more of the method, algorithms, and/or operations described above. The computer-readable data storage medium may form part of a computer program product, which may include packaging materials.

A computer-readable memory, as used herein, includes any type of storage media, e.g., a random access memory (RAM), a synchronous dynamic random access memory (SDRAM), a read-only memory (ROM), a non-volatile random access memory (NVRAM), an electrically erasable programmable read-only memory (EEPROM), a FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The phrase "urging an object" or similar means the application of a force to the object in a manner that will try and move the object toward a defined position or in a specific direction without implying that the object moves or that the object is restricted from moving in another direction, even backward with respect to the direction of the applied force.

Claim language reciting "an item" or similar language indicates and includes one or more than one of the items. For example, claim language reciting "a part" means one part or multiple parts.

Moreover, claim language reciting "at least one of" a set indicates that one member of the set or multiple members of the set satisfy the claim. For example, claim language reciting "at least one of A and B" means A, B, or A and B.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Statements of the Disclosure Include:

(A1) A method of smoothing a resistivity log, comprising steps: coupling an azimuthal resistivity tool into a drill string, the azimuthal resistivity tool configured to measure an azimuthal impedance at an azimuthal angle around a wellbore axis; measuring a plurality of first azimuthal impedances at a respective plurality of azimuthal angles at a depth; determining whether the drill string was in a drilling mode or a sliding mode while at the depth; determining, if the drill string was in the drilling mode, a first co-axial component and a lateral component based in part on the plurality of first azimuthal impedances associated with the depth and storing the lateral component; and determining, if the drill string was in the sliding mode, a second co-axial component based in part on at least one of the plurality of first azimuthal impedances and a previously stored lateral component.

(A2) The method of A1, wherein at least one lateral component is stored before the step of determining the second co-axial component is performed.

(A3) The method of A1, wherein: the plurality of azimuthal angles comprises a predetermined number of azimuthal angles over a complete rotation about the wellbore axis; and the step of measuring the plurality of first azimuthal impedances comprises recording the measured first azimuthal impedances at the respective predetermined azimuthal angles.

(A4) The method of A3, wherein: the step of determining whether the drill string was in the drilling mode or the sliding mode comprises determining a percentage of the predetermined azimuthal angles having a valid measured impedance; and the drill string was in the sliding mode if the percentage is less than a threshold otherwise the drill string was in the drilling mode.

(A5) The method of A3, wherein: the step of determining the second co-axial component comprises selecting a valid measured impedance from the recorded first azimuthal impedances.

(A6) The method of A1, wherein: the step of storing the lateral component comprises storing the associated depth.

(A7) The method of A6, wherein the previously stored lateral component is one of a most-recently stored lateral component and a nearest-depth stored lateral component.

(A8) The method of A7, further comprising the steps of: providing, if the drill string was in the drilling mode, the first co-axial component; providing, if the drill string was in the sliding mode, the second co-axial component.

(A9) The method of A8, further comprising the step of: collecting the provided first co-axial components and the second co-axial components and the respective associated depths; determining a resistivity at each depth based in part of the collected first and second co-axial components; and creating a drilling log based on the determined resistivities and associated depths.

(B10) A system for providing a smoothed resistivity log, comprising: a body configured to be coupled into a drill string disposed in a wellbore having a wellbore axis and comprising a tool axis that is aligned with the wellbore axis when the body is disposed in the wellbore; an antenna coupled to the body and disposed at a non-zero angle to the tool axis; an electronics module coupled to the antenna and configured to measure an impedance and provide the measured impedance; a geosensor configured to provide an azimuthal angle of the antenna about the wellbore axis and a depth; a processor coupled to the electronics module and to the geosensor; and a memory coupled to the processor and comprising instructions that, when loaded into the processor and executed, cause the processor to execute steps: receiving a plurality of impedances and respective azimuthal angles at a respective plurality of depths; determining whether the drill string was in a drilling mode or a sliding mode at each of the respective plurality of depths; determining, if the drill string was in the drilling mode, a first co-axial component and a lateral component based in part on the plurality of impedances associated with that depth and storing the lateral component; and determining, if the drill string was in the sliding mode, a second co-axial component based in part on at least one of the plurality of impedances associated with that depth and a previously stored lateral component.

(B11) The system of B10, wherein at least one lateral component must be stored before the step of determining the second co-axial component is performed.

(B12) The system of B10, wherein: the plurality of azimuthal angles comprises a predetermined number of azimuthal angles over a complete rotation about the wellbore axis; and the step of measuring the plurality of azimuthal impedances comprises recording the measured first azimuthal impedances at each of the predetermined azimuthal angles.

(B13) The system of B12, wherein: the step of determining whether the drill string was in the drilling mode or the sliding mode comprises determining a percentage of the predetermined azimuthal angles having a valid measured impedance; and the drill string was in the sliding mode if the percentage is less than a threshold otherwise the drill string was in the drilling mode.

(B14) The system of B13, wherein: the step of determining the second co-axial component comprises selecting a valid measured impedance from the recorded first azimuthal impedance.

(B15) The system of B10, wherein the instructions further cause the processor to execute steps: storing, in association with each depth, either the first co-axial component or the second co-axial component.

(B16) The system of B15, further comprising the step of: determining a resistivity at each depth based in part of the collected first and second co-axial components; and creating a drilling log based on the determined resistivities and associated depths.

(B17) The system of B10, wherein: the step of measuring the plurality of first azimuthal impedances is associated with a depth; and the step of storing the lateral component comprises storing the associated depth.

(B18) The system of B17, wherein the previously stored lateral component is one of a most-recently stored lateral component and a nearest-depth stored lateral component.

(C19) A memory comprising instructions that, when loaded into a processor and executed, cause the processor to execute steps: receiving a plurality of impedances and respective azimuthal angles at a respective plurality of depths; determining whether the drill string was in a drilling mode or a sliding mode at each of the respective plurality of depths; determining, if the drill string was in the drilling mode, a first co-axial component and a lateral component based in part on the plurality of impedances associated with that depth and storing the lateral component; and determining, if the drill string was in the sliding mode, a second co-axial component based in part on at least one of the plurality of impedances associated with that depth and a previously stored lateral component.

(C20) The memory of C19, wherein the instructions further cause the processor to execute the step: determining a resistivity at each depth based in part of the collected first and second co-axial components; and creating a drilling log based on the determined resistivities and associated depths.

What is claimed is:

1. A method of smoothing a resistivity log, comprising steps:
coupling an azimuthal resistivity tool into a drill string, the azimuthal resistivity tool configured to measure an azimuthal impedance at an azimuthal angle around a wellbore axis;
measuring a plurality of first azimuthal impedances at a respective plurality of azimuthal angles at a depth;
determining whether the drill string was in a drilling mode or a sliding mode while at the depth;
determining, if the drill string was in the drilling mode, a first co-axial component and a lateral component based in part on the plurality of first azimuthal impedances associated with the depth and storing the lateral component;
determining, if the drill string was in the sliding mode, a second co-axial component based in part on at least one of the plurality of first azimuthal impedances and a previously stored lateral component; and
steering a drill bit connected to the drill string based on one of the determined first co-axial component and the lateral component and the determined second co-axial component.

2. The method of claim 1, wherein at least one lateral component is stored before the step of determining the second co-axial component is performed.

3. The method of claim 1, wherein:
the plurality of azimuthal angles comprises a predetermined number of azimuthal angles over a complete rotation about the wellbore axis; and
the step of measuring the plurality of first azimuthal impedances comprises recording the measured first azimuthal impedances at the respective predetermined azimuthal angles.

4. The method of claim 3, wherein:
the step of determining whether the drill string was in the drilling mode or the sliding mode comprises determining a percentage of the predetermined azimuthal angles having a valid measured impedance; and
the drill string was in the sliding mode if the percentage is less than a threshold otherwise the drill string was in the drilling mode.

5. The method of claim 3, wherein:
the step of determining the second co-axial component comprises selecting the valid measured impedance from the recorded first azimuthal impedances.

6. The method of claim 1, wherein:
the step of storing the lateral component comprises storing the associated depth.

7. The method of claim 6, wherein the previously stored lateral component is one of a most-recently stored lateral component and a nearest-depth stored lateral component.

8. The method of claim 7, further comprising the steps of:
providing, if the drill string was in the drilling mode, the first co-axial component;
providing, if the drill string was in the sliding mode, the second co-axial component.

9. The method of claim 8, further comprising the step of:
collecting the provided first co-axial components and the second co-axial components and the respective associated depths;
determining a resistivity at each depth based in part of the collected first and second co-axial components; and
creating a drilling log based on the determined resistivities and associated depths.

10. A system for providing a smoothed resistivity log, comprising:
a body configured to be coupled into a drill string disposed in a wellbore having a wellbore axis and comprising a tool axis that is aligned with the wellbore axis when the body is disposed in the wellbore;
an antenna coupled to the body and disposed at a non-zero angle to the tool axis;
an electronics module coupled to the antenna and configured to measure an impedance and provide the measured impedance;
a geosensor configured to provide an azimuthal angle of the antenna about the wellbore axis and a depth;
a processor coupled to the electronics module and to the geosensor; and
a memory coupled to the processor and comprising instructions that, when loaded into the processor and executed, cause the processor to execute steps:
receiving a plurality of impedances and respective azimuthal angles at a respective plurality of depths;
determining whether the drill string was in a drilling mode or a sliding mode at each of the respective plurality of depths;
determining, if the drill string was in the drilling mode, a first co-axial component and a lateral component based in part on the plurality of impedances associated with that depth and storing the lateral component;
determining, if the drill string was in the sliding mode, a second co-axial component based in part on at least one of the plurality of impedances associated with that depth and a previously stored lateral component; and
steering a drill bit connected to the drill string based on one of the determined first co-axial component and the lateral component and the determined second co-axial component.

11. The system of claim 10, wherein at least one lateral component must be stored before the step of determining the second co-axial component is performed.

12. The system of claim 10, wherein:
the plurality of azimuthal angles comprises a predetermined number of azimuthal angles over a complete rotation about the wellbore axis; and
the step of measuring the plurality of azimuthal impedances comprises recording the measured first azimuthal impedances at each of the predetermined azimuthal angles.

13. The system of claim 12, wherein:
the step of determining whether the drill string was in the drilling mode or the sliding mode comprises determining a percentage of the predetermined azimuthal angles having a valid measured impedance; and the drill string was in the sliding mode if the percentage is less than a threshold otherwise the drill string was in the drilling mode.

14. The system of claim 13, wherein:

the step of determining the second co-axial component comprises selecting the valid measured impedance from the recorded first azimuthal impedance.

15. The system of claim 10, wherein the instructions further cause the processor to execute steps:

storing, in association with each depth, either the first co-axial component or the second co-axial component.

16. The system of claim 15, further comprising the step of:

determining a resistivity at each depth based in part of the collected first and second co-axial components; and creating a drilling log based on the determined resistivities and associated depths.

17. The system of claim 10, wherein:

the step of measuring the plurality of first azimuthal impedances is associated with a depth; and the step of storing the lateral component comprises storing the associated depth.

18. The system of claim 17, wherein the previously stored lateral component is one of a most-recently stored lateral component and a nearest-depth stored lateral component.

19. A memory comprising instructions that, when loaded into a processor and executed, cause the processor to execute steps:

receiving a plurality of impedances and respective azimuthal angles at a respective plurality of depths;

determining whether the drill string was in a drilling mode or a sliding mode at each of the respective plurality of depths;

determining, if the drill string was in the drilling mode, a first co-axial component and a lateral component based in part on the plurality of impedances associated with each of the respective plurality of depths and storing the lateral component;

determining, if the drill string was in the sliding mode, a second co-axial component based in part on at least one of the plurality of impedances associated with each of the respective plurality of depths and a previously stored lateral component; and steering a drill bit connected to the drill string based on one of the determined first co-axial component and the lateral component and the determined second co-axial component.

20. The memory of claim 19, wherein the instructions further cause the processor to execute the step:

determining a resistivity at each depth based in part of the collected first and second co-axial components; and creating a drilling log based on the determined resistivities and associated depths.

* * * * *